US011296903B2

(12) United States Patent
Jerolm et al.

(10) Patent No.: US 11,296,903 B2
(45) Date of Patent: Apr. 5, 2022

(54) MASTER OF A BUS SYSTEM

(71) Applicant: WAGO Verwaltungsgesellschaft mbH, Minden (DE)

(72) Inventors: Daniel Jerolm, Bad Essen (DE); Frank Quakernack, Bielefeld (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 85 days.

(21) Appl. No.: 16/805,411

(22) Filed: Feb. 28, 2020

(65) Prior Publication Data
US 2020/0204398 A1 Jun. 25, 2020

Related U.S. Application Data

(63) Continuation of application No. PCT/IB2018/000810, filed on Jul. 27, 2018.

(30) Foreign Application Priority Data

Aug. 31, 2017 (DE) ..................... 10 2017 008 186.7

(51) Int. Cl.
*H04L 12/40* (2006.01)
*H04L 69/324* (2022.01)
(52) U.S. Cl.
CPC ...... *H04L 12/40019* (2013.01); *H04L 69/324* (2013.01)
(58) Field of Classification Search
CPC ............... H04L 12/40; H04L 12/40006; H04L 12/40013; H04L 12/40019; H04L 12/40065; H04L 12/40078; H04L 69/324
See application file for complete search history.

(56) References Cited

U.S. PATENT DOCUMENTS

| | | | | | |
|---|---|---|---|---|---|
| 4,636,858 | A | * | 1/1987 | Hague | ..................... H04N 5/926 348/463 |
| 5,586,248 | A | * | 12/1996 | Alexander | ............. G11C 29/88 714/22 |
| 6,553,432 | B1 | * | 4/2003 | Critz | ..................... G06F 3/0611 710/10 |

(Continued)

FOREIGN PATENT DOCUMENTS

| | | |
|---|---|---|
| DE | 100 06 265 B4 | 3/2006 |
| EP | 1 133 106 A2 | 9/2001 |

(Continued)

OTHER PUBLICATIONS

TMS380 Adapter Chipset User's Guide Local Area Network Products; Texas Instruments; © 1986 by Texas Instruments.

(Continued)

*Primary Examiner* — Kevin D Mew
(74) *Attorney, Agent, or Firm* — Muncy, Geissler, Olds & Lowe, P.C.

(57) ABSTRACT

A master of a bus system for process control with one slave and a bus. A transceiver circuit transmits and receives for process control by data packets. A channel has a receive memory area. The transceiver circuit is set up to write the receive data of a data packet received via the bus into the receive memory area. The channel has at least one selection circuit, an output of the selection circuit being connected to the transceiver circuit. The selection circuit has a first input for selecting initial data. The selection circuit has a second input, the second input being connected to the receive memory area, and the selection circuit is configured to select the transmit data from the initial data and/or the data written into the receive memory area and to output the transmitted data to the transceiver circuit for a data packet to be transmitted.

26 Claims, 6 Drawing Sheets

(56) References Cited

U.S. PATENT DOCUMENTS

| | | | | |
|---|---|---|---|---|
| 6,735,683 | B2* | 5/2004 | Kawasaki | G06F 15/7814 |
| | | | | 712/1 |
| 8,006,022 | B2 | 8/2011 | Hoffmann | |
| 10,750,377 | B1* | 8/2020 | Zihir | H04W 72/046 |
| 2005/0198425 | A1* | 9/2005 | Wang | G06F 13/387 |
| | | | | 710/305 |
| 2006/0075145 | A1* | 4/2006 | Mueller | H04L 1/188 |
| | | | | 710/3 |
| 2008/0263228 | A1* | 10/2008 | Kawasaki | G06F 13/36 |
| | | | | 710/1 |
| 2008/0279138 | A1* | 11/2008 | Gonikberg | H04W 88/06 |
| | | | | 370/328 |
| 2008/0279162 | A1* | 11/2008 | Desai | H04W 72/1215 |
| | | | | 370/338 |
| 2010/0262720 | A1* | 10/2010 | Daly, Jr | G06F 13/4022 |
| | | | | 710/5 |
| 2013/0151741 | A1* | 6/2013 | Walker | G06F 13/1668 |
| | | | | 710/110 |
| 2013/0262724 | A1 | 10/2013 | Wegener et al. | |
| 2016/0062930 | A1* | 3/2016 | Kijima | G06F 13/364 |
| | | | | 710/110 |
| 2020/0026684 | A1* | 1/2020 | Swarbrick | G06F 13/4226 |

FOREIGN PATENT DOCUMENTS

| | | |
|---|---|---|
| EP | 2 110 995 A1 | 10/2009 |
| EP | 2 355 419 A1 | 8/2011 |

OTHER PUBLICATIONS

TMS380 Adapter Chipset User's Guide Supplement Local Area Network Products; Texas Instruments; © 1986 by Texas Instruments.

* cited by examiner

MASTER OF A BUS SYSTEM

This nonprovisional application is a continuation of International Application No. PCT/162018/000810, which was filed on Jul. 27, 2018, and which claims priority to German Patent Application No. 10 2017 008 186.7, which was filed in Germany on Aug. 31, 2017, and which are both herein incorporated by reference.

BACKGROUND OF THE INVENTION

Field of the Invention

The present invention relates to a bus master for process control. The bus system further comprises at least one slave and one bus.

Description of the Background Art

A device for controlling the data exchange of a communication participant of a serial master-slave communication system is disclosed in DE 100 06 265 B4. There is a need to expand the communication possibilities within a serial master-slave communication system without unduly sacrificing the advantages. The communication participant with the device acts as master within a group of several master/slave groups of the serial master-slave-communication system.

SUMMARY OF THE INVENTION

It is therefore an object of the present invention to provide a master of a bus system expanding the flexibility of communication within the bus system to the extent possible.

A master of a bus system is therefore provided for process control. The bus system comprises a slave in addition to the master and a bus connecting the master and the slave. A slave is thereby understood to be at least one slave, so that one or more slaves are connected to the master within the bus system.

The master comprises a transceiver circuit for sending transmit data and receiving receive data via data packets. The transmit data and the receive data are designed for process control. The transmit data and the receive data can also be referred to as process data. Preferably, the transceiver circuit is directly connected to the bus for transmitting and receiving data packets.

The master includes a channel that comprises at least one receive memory area. A channel is understood to be at least one channel, wherein the master has exactly one channel or several channels, each of which can comprise a receive memory area. The channel has an electronic circuit which is connected to the transceiver circuit. The channel circuit is preferably configured for a dedicated communication channel via the bus. Accordingly, different channels of the master may have different circuits. Furthermore, the channel can have a logical link to one or more slaves via the bus. The receive memory area is advantageously designed as a buffer. For instance, the receive memory area is designed with a FIFO function. The receive memory area is formed, for example, of a number of hardware buffers in an ASIC (Application Specific Integrated Circuit), or alternatively, as part of a particularly volatile total memory in an FPGA (Field-Programmable-Gate-Array). Preferably, the maximum capacity of the receive memory area is fixed. Advantageously, the channel is designed in such a way that no software program can access the receive memory area while the system is running.

The transceiver circuit is configured in such a way that the receive data of a data packet received via the bus can be written into the receive memory area. Preferably, the transceiver circuit is set up in such a way that the receive data is extracted from the data packet based on the data packet structure. In addition, the transceiver circuitry can include a number of other functions, such as checking the data packet.

The channel has a data select circuit. Here, a data select circuit is understood to be at least one data select circuit, meaning that the channel can have exactly one data select circuit or several data select circuits. One output of the data select circuit is connected to the transceiver circuit. Although it is possible for the data select circuit to select by means of tables and addressing, but it is preferred that the data select circuit is formed of switching elements. The switching elements can form a multiplexer, for example. It is also possible to form the data select circuit using a gate logic to select the transmit data for the data packet to be transmitted.

The data select circuit comprises a first input for selecting initial data. The data select circuit also comprises a second input. Preferably, the first input and the second input are digital inputs with the same bit width. The second input is connected to the receive memory area. The first input is connected in order to provide the initial data.

The selection circuit is set up to select the transmit data from the initial data and/or the receive data written into the receive memory area and to output the transmit data to the transceiver circuitry for a data packet to be transmitted. The selection includes the first scenario, wherein all initial data are selected as transmit data by the data select circuit. The selection also includes the second scenario, wherein all receive data is selected as transmit data by the data select circuit. The selection also includes the third scenario, wherein a part of the initial data is selected together with a part of the receive data as transmit data by the data select circuit.

These embodiments of the invention allow for greater flexibility. Advantages of specific embodiments of the invention are described in the description of the figures.

The transceiver circuit can be configured to receive a data packet with a head and a data section via the bus and to read the receive data from the data section of the received data packet. To receive the data packet, for example, a signal arriving at the transceiver circuit via the bus is sampled. To read the receive data from the data section of the received data packet, for instance, the receive data within the data packet is determined—for instance—based on the position within the data packet.

The transceiver circuit can be set up to generate a data packet to be transmitted with a head and a data section. To generate this, it is advantageous to create a new head and write it, for example, into a send register. The data section, for example, is then appended to the newly created head. In addition to the head and the data section, the data packet can have one or more further fields, for instance, a check value CRC (Cyclic Redundancy Check), which can also be called a checksum.

The link between the receive memory area and the second input can be designed for direct transmission of the receive data. A software program of a CPU is not required for direct transmission. For example, the direct link is implemented by fixed wiring or by a copier—e.g. a state machine or direct memory access (DMA).

The transceiver circuit can be set up to write the transmit data into the data section of the data packet to be sent when the data packet to be sent is generated. The transmit data can be appended to the data section for writing, for example, after the head of the data packet has been created. The data section can also be referred to as payload.

The transceiver circuit can be configured to check the receive data of the received data packet and write the receive data into the receive memory area. Preferably, the transceiver circuit is configured to write the receive data into the receive memory area only if the test result is positive. For example, a validity value transmitted with the data packet can be evaluated for checking purposes. Preferably, the transceiver circuit is set up to check the receive data against a test value CRC. For example, the test value may have 32-bit coefficients.

The receive memory area can comprise at least sufficient capacity to store all receive data of the received data packet simultaneously. Ideally, the capacity of the receive memory area can be configured manually or automatically.

The master can have a first buffer and a second buffer for receiving the receive data. For example, the first buffer and the second buffer are part of the receive memory area. A buffer may also be called data buffer. The buffer is used to temporarily store the receive data.

The transceiver circuit can be set up to write the receive data into the second buffer if previous receive data of a previously received data packet is stored as valid receive data in the first buffer.

The transceiver circuit can be set up to write the receive data into the first buffer if previous receive data of a previously received data packet is stored as valid receive data in the second buffer.

For the selection of the transmit data from the receive memory area, the data select circuit is configured to select the receive data from the first buffer or second buffer, which originate from the last received data packet having valid receive data/

The first buffer comprises at least sufficient capacity to store all receive data of the received data packet simultaneously. Pursuant to an advantageous further development of the present invention, the second buffer comprises at least sufficient capacity to store all receive data of the received data packet simultaneously.

The transceiver circuit can be configured to generate the data packets for the transmit data and the receive data. The transmit data and the receive data are preferably part of the process control. Consequently, the transceiver circuitry is configured to generate the data packet with a predetermined structure of the data packet. Both the data packets sent by the master and the data packets received by the master are generated in the bus system exclusively by the transceiver circuitry of the master. During this process, the data packets sent by the master are returned to the master via the bus and the slave or several slaves. Advantageously, the bus is designed as a ring bus. Preferably, the generated data package has a head and a data section for the send data or receive data.

The transceiver circuit can be configured to assign the channel to the transmit data by means of an identifier. For this purpose, the identifier is inserted into the data package with the corresponding transmit data. Advantageously, the transceiver circuitry is also configured to assign the channel to the receive data by means of the identifier in the data packet. For this purpose, the identifier is read out of the received data packet.

It is possible to configure the transceiver circuit in such a way that the assignment is carried out by means of addressing. However, according to an advantageous design, the transceiver circuit has an assignment circuit, for example with a table (LUT—Look Up Table). For example, a link to one channel (of several channels) is assigned to each characteristic value of the identifier that is present at the input of the LUT.

The transceiver circuit can have a first finite state machine (finite state automaton). The transceiver circuitry is set up to generate the data packet for the process control with the identifier by means of the first finite state machine. Preferably, the first finite state machine is composed of a closed, dedicated hardware circuit. This allows for the first finite state machine to operate largely independently of and/or in parallel with a program on a master processor.

The transceiver circuit can comprise a second finite state machine. The second finite state machine is configured to write the receive data of the received data packet into the receive memory area of the channel based on the identifier contained in the received data packet and the channel assignment. Preferably, the second finite state machine is composed of a closed, dedicated hardware circuit. This allows for the second finite state machine to operate largely independently of and/or in parallel with a program on a master processor. Furthermore, the first and second finite state machines are preferably configured as isolated switching elements of the transceiver.

The transceiver circuit can have a control input. The transceiver circuit is set up to generate the data packet based on a control signal at the control input. Preferably the master has a frame generator circuit. The frame generator circuit is configured to generate a cyclic frame and to position data packets in time within the cyclic frame. The frame generator circuit is configured to generate the control signal for a data packet and apply it to the control input of the transceiver circuit.

The channel for storing the initial data can have a transmission memory area. Advantageously, the master is configured to write the initial data as transmit data into the transmission memory area. For example, the master has a processor and a program run by the processor, which are configured for process control. Advantageously, the processor and the program are configured to write the initial data as transmit data into the transmission memory area via a channel interface.

The master can have a fieldbus interface circuit. The fieldbus interface circuit is linked to the transmission memory area of the channel. For instance, the fieldbus interface circuit is linked to the transmission memory area via an integrated on-chip parallel bus. The fieldbus interface circuit is configured for entering process data received via a fieldbus—in the form of the initial data—into the transmission memory area. For example, the process data can be retrieved from a fieldbus telegram and written changed or unchanged as the initial data into the transmission memory area.

The data select circuit can be configured for bit-granular selection. By means of the data select circuit, the transmit bits of the transmit data are composed bit by bit of bits of the initial data and bits of the receive data. Advantageously, the data select circuit for bit-granular selection has a changeover element for each bit, wherein each changeover element can be controlled by a control bit.

The first input of the data select circuit for the initial data has a bit width of several bits. Advantageously, the data select circuit has a change-over element for each of the several bits. It is advantageous that the data select circuit is configured such that the change-over elements can be controlled independently of each other.

The channel has a control memory, wherein control values control the data select circuit. The control values can preferably control the change-over elements of the data select circuit in bit-granular form, in order to combine the bits of the transmit data individually from bits of the initial data and bits of the receive data.

The initial data of the channel can be fixed data. For example, it is possible that the initial data are programmed into a register. Preferably, the fixed data are formed by connections to high-potential and/or low-potential. The fixed data are present at the first input of the data select circuit. For example, the bits of the initial data all have low potential.

The receive memory area can comprises a control output to send a control signal used to control the data select circuit. To this end, the control output is linked to an input of the data select circuit. The receive memory area is configured to apply a value of the control signal based on the reception of the receive data to the input of the data select circuit. It is advantageous that the receive memory area is configured to set the value of the control signal based on a reception detected as valid.

The master can have a plurality of channels. Advantageously, the circuits of at least two channels are configured differently. Advantageously, each of the two channels has at least two different characteristics of the developments described previously.

A method for operating a bus system for process control is also provided. The bus system comprises a master and a slave. A slave is understood to be at least one slave, so that the master has exactly one slave or several slaves.

In the method, the master generates a data packet with transmit data for the process control. Advantageously, parts of the data package, such as a head and a payload data section, are determined and buffered so as to generate the data packet. The transmit data is data that is sent by the master to at least one or more slaves of the bus system.

The master writes the transmit data from a selected channel into a payload data section of the data packet. For example, the channel has a transmit memory area that contains the transmit data. Preferably, the writing starts after the selection of the channel, but before the master starts sending the data packet.

The master writes an identifier associated with the selected channel into the data packet. The identifier can be written into the head or the payload data section of the data packet. The identifier preferably has a value with a fixed number of bits, for example 4 bits or 8 bits. The association between identifier and channel can be made, for example, by means of a table or another assignment rule.

The master sends the data packet containing the identifier and the transmit data to the slave. Advantageously, the data packet is sent at a defined time within a cyclic frame.

The data packet sent to the slave is transmitted back to the master. Prior to this, the slave can alter the data package, especially data in the payload data section. This way, data is directed from the slave to the master.

Subsequently, the data packet is received by the master. The master assigns the received data packet to the selected channel based on the identifier. For this purpose, the identifier is determined within the data packet, for example from the position within the data packet. The identifier can, for example, be clearly assigned to the channel using a table. The channel of the transmitted data packet and the channel of the received data packet match if the identifier is identical.

The receive data of the receiving data packet is stored in the selected channel. The receive data stored in the channel can be used subsequently. For example, the receive data is evaluated by the master. It is also possible to forward the receive data, for example via a fieldbus connected to the master.

Pursuant to an advantageous further embodiment, the method steps explained above are carried out in the order mentioned.

Pursuant to an advantageous further embodiment, the master will select one channel from a set of at least two different channels for different transmit data. The selection is preferably controlled by another control circuit of the master.

At least a part of the receive data stored in the selected channel can be written into the transmit data for a data packet to be transmitted. Advantageously, the part of the receive data stored in the selected channel is selected by the master. This part is combined by the master with further data to generate the transmit data. In accordance with an advantageous further embodiment, this part is written into a data packet with the same identifier to be sent subsequently. Although it is possible that data packets with the same identifier follow each other directly, data packets with different identifiers can also follow each other.

The master can determine whether or not a slave is participating in a bus communication in the bus. Failure to participate can be determined by means of a counter value and/or a query, for example. Preferably, the master writes the part of the receive data belonging to the identified slave into the transmit data of the channel. Here, the corresponding part of the receive data may be written continuously into the transmit data of the channel without abort. Alternatively, the corresponding part of the receive data is written into the transmit data of the channel until an abort condition is met.

An abort condition can be, for example, a change in configuration or an abort condition is given by the resumption of the slave's participation in the bus communication or the abort condition is generated by software on the master's processor. For example, if a slave is decoupled from the bus, "pulled", the part of the data of this slave is missing in the receive data. The master may reuse the last valid part of the receive data of this slave by feeding it back into the transmit data. Although this part represents outdated data, it is valid at the relevant time.

The receive data stored in the selected channel for a data packet to be transmitted can be completely written into the transmitted data. This causes data to be circulated within the bus. Advantageously, at least two slaves engage in the communication via the circulating data. Here, the master generates a new data packet for each loop, wherein the receive data of the received data packet is preferably transferred unchanged into the transmit data of the next data packet. This allows for data to be transferred in any direction from any slave linked to the bus to any other slave linked to the bus. Preferably, the data packets of the loop are transmitted cyclically.

The transmit data can be selected from initial data and/or the receive data written into the receive memory area by means of a data select circuit of the master. Here, one input of the data select circuit is linked to a receive memory area of the selected channel. An output of the data select circuit is linked to the transceiver circuit so that the transmit data is output into a data packet to be transmitted. It is advantageous that the data select circuit is controlled by a control signal.

A bus system with a master and a slave is also provided for process control.

The master is configured to generate a data packet with transmit data for process control.

The master is configured to write the transmit data from a selected channel into a payload data section of the data packet.

Each channel has a corresponding memory area for its transmit data.

The master is configured to write an identifier associated with the selected channel into the data packet.

The master is configured to send the data packet containing the identifier and the transmit data to the slave.

The slave can be configured to receive the data packet. The slave is configured to read at least part of the transmit data and/or write at least part of the receive data based on the identifier. The slave is configured to send the data packet back to the master.

The master can be configured to receive the data packet.

The master can be configured to assign the received data packet to the selected channel based on the identifier.

The master is configured to store the receive data of the received data packet in the selected channel.

A slave is exactly one slave or several slaves. In a very small bus system, a master can be linked to a single slave. In a common bus system, several slaves are often linked to each other and to the master via the bus. For example, the master and the slaves are linked in a ring structure. A data packet is exactly one data packet or several consecutive data packets. For example, a large number of data packets can be transmitted one after the other via the bus of the bus system.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
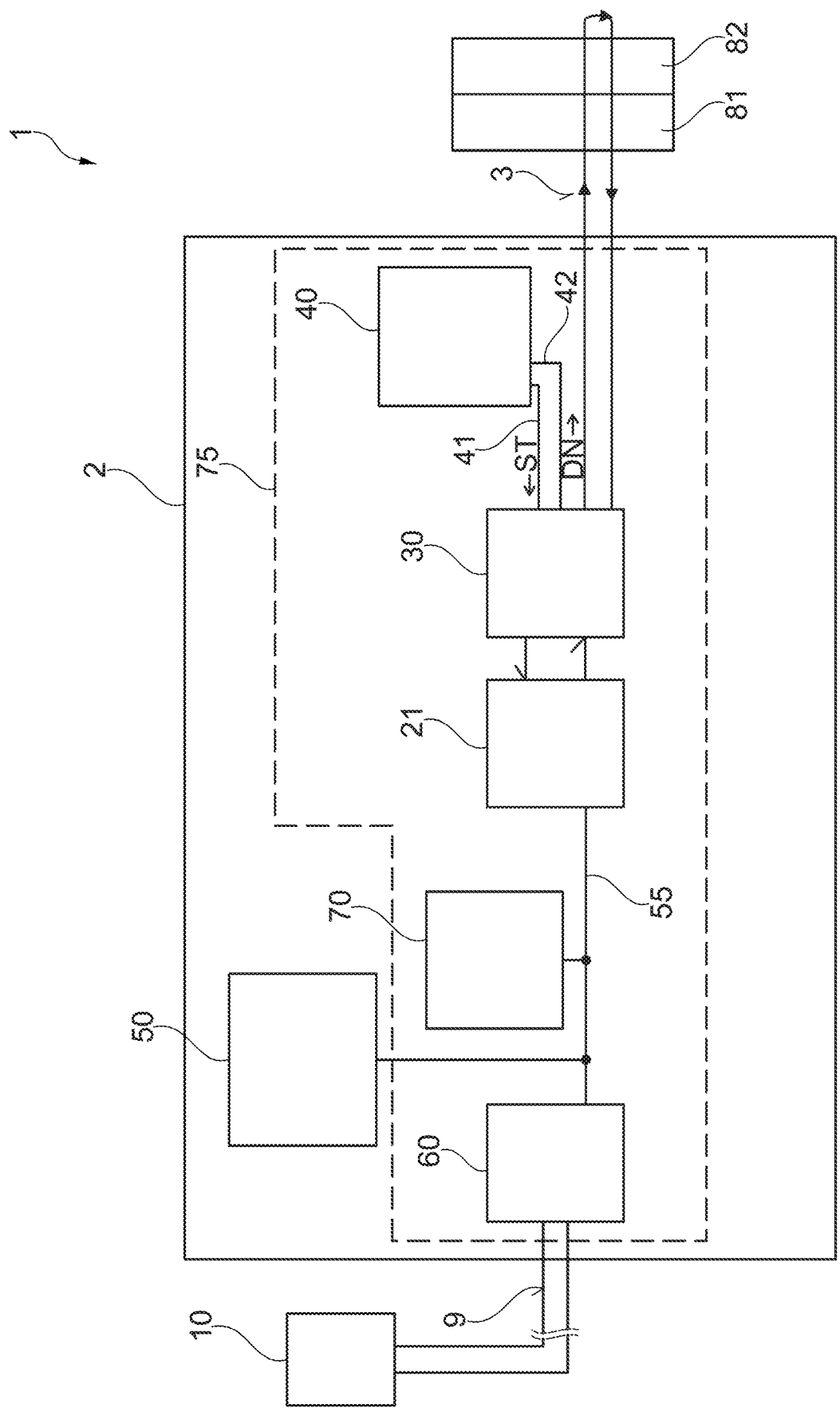
FIG. 1 is a schematic block diagram of a bus system

FIG. 1 shows a schematic block diagram of an automation system. The skilled person will understand that the automation system shown is only exemplary and all elements, modules, components, master, slaves, user and units belonging to the automation system can be designed differently but can still perform the basic functions described here.

The automation system shown in FIG. 1 has a higher-level control 10, which can be implemented, for example, with a programmable logic controller (PLC). Such a higher-level control system 10 can also be referred to as a control station. Such a PLC 10 serves to control and regulate the process performed by the automation system.

To control the automation system process, the PLC 10 is linked to automation devices. To keep the wiring complexity low, bus systems are used for these connections. In the embodiment shown in FIG. 1, the PLC 10 is connected to a master 2 of a subordinate bus system 1 by means of a higher-level bus 9, which may be a fieldbus in the embodiment shown here.

Accordingly, the master 2 can also be designated as local bus master and the subordinate bus system 1 as local bus system. Notwithstanding the embodiment shown in FIG. 1, the control and regulation of the process performed by the automation system can be carried out by a processing unit 50 of the master 2 instead of the PLC 10. The processing unit 50 of the master 2, for example, is configured as a processor.

In the embodiment shown here in FIG. 1, the higher-level bus 9 is connected to the local bus master 2. For this purpose, the local bus master 2 has a first interface that can be connected to the higher-level bus 9. The local bus master 2 in the embodiment shown in FIG. 1 has a further second interface to connect the local bus master 2 with the local bus 3. Slaves 81, 82 are linked to the local bus 3. These slaves 81, 82 can also be referred to as data bus participants 81, 82.

Bus 3 is advantageously configured in such a way that a data packet sent by the master 2 is transmitted by all slaves 81, 82 connected to bus 3 and back to the master 3. In doing so, a slave 82 receives only a part of the data packet from its upstream slave 81. After a period of time in which the data contained in this part can be processed by the slave 81, the part is forwarded to the downstream slave 82 and at the same time a new part of the data packet is received by the master 2. Thus, all parts of the data packet pass sequentially through all the slaves 81, 82. The bus 3 is advantageously provided as a ring-shaped structure. Such local buses may also be referred to as ring buses. The bus can alternatively be stranded or star-shaped or a combination or mixture of the above. The transmission and reception of the data packets is done via the second interface of the master 3. In the embodiment shown here, the second interface has an uplink and a downlink.

The direction of data transmission in the ring bus 3 is shown with arrows in the embodiment in FIG. 1. In the embodiment shown in FIG. 1, the bus links are implemented by means of cables or printed circuit boards for direct or indirect contacting by means of electrical contacts. Alternatively, a wireless, optical or radio connection is possible. In the embodiment shown in FIG. 1, the master 2 and the slaves 81, 82 have electrical contacts (not shown) for the bus 3 on the housing. For easy connection of the master 2 and the slaves 81, 82, these can also be arranged on a common fixture, for example a top-hat rail.

For easy identification, the slaves 81, 82 are shown in a very simplified form in FIG. 1, and may, for example, have an analogous or digital input and/or an analog or digital output (not shown) in order to connect sensors or actuators for process control. The slaves 81, 82 can have a modular design, so that during operation a slave 81 can be removed from the bus system 1 or added. The ring bus infrastructure is formed of modular units and the slaves 81, 82 are interchangeable, so that ring bus 3 can be set up with any type of slave and a desired number of slaves 81, 82. The modularity also ensures that even if a slave is removed, e.g. 81, communication between the remaining data bus participants 82 and the master 2 is not interrupted, as communication occurs via the remaining module units. This is also termed Hot Swapping. The modules are often referred to as I/O modules.

FIG. 1 shows a block diagram of an embodiment with a master 3. The master 3 is connected to the higher-level fieldbus 9. To process the data streams received via the fieldbus interface or the data streams to be sent, the master 3 has a circuit 60, which can be described as a fieldbus interface circuit 60 or also as a processing unit or fieldbus core (FBC). If the processor 50 of the master 2 takes over the process control, the FBC 60 can remain unused or the FBC 60 and PLC 10 can be dispensed with.

The FBC 60 and the processor 50 are connected via a parallel bus 55 to a data control unit 70 and a channel 21. The parallel bus 55 for example is a 32-bit parallel bus. Alternatively, the connection 55 may be any other connection that allows for data transfer between units. In the embodiment shown in FIG. 1, the processor 50 is set up to configure the FBC 60, the data management unit 70 and the channel 21.

The data management unit 70 is configured to transfer data to channel 21 in order to send the data to the ring bus 3 in at least one data packet. The data may be process data received from the FBC 60 via fieldbus 9 in fieldbus telegrams. Alternatively, the data could also be process data generated by the processor 50.

The master 2 comprises a transceiver circuit 30, which is set up to generate bus conforming data packets for data transmission on the bus 3 and to insert the data received from channel 21 in the corresponding data packet. In addition, the transceiver circuit 30 is set up to receive data packets sent back via the bus 3. Data contained in the receiving data packets are written to channel 21 by the transceiver circuit 30. From channel 21, this data can be entered into FBC 60 and/or the processor 50 for further processing via the parallel bus 55 by means of the data management unit 70.

The master 2 also comprises a control circuit 40 for controlling the transceiver circuit 30. Here, controlling takes place concurrently with a program sequence in the processor 50 and is largely independent of the processor 50. The control circuit 40 can also be described as a cyclic frame generator, wherein the control circuit 40 controls the transceiver circuit 30 for generating a cyclic frame. In addition, this control circuit 40 is configured to address the transceiver circuit 30 to generate a data packet. The transceiver circuit 30 starts transmitting a data packet when the control circuit 40 applies the control signal St via the connection 41 to the transceiver circuit 30. For example, the control signal ST is used to transmit a start pulse, an identifier ILI and the length of the data packet to the transceiver circuit 30. The identifier ILI may also be referred to as an index. After sending the data packet, the transceiver circuit 30 informs the control circuit 40 about the end by means of an acknowledgement signal DN via the connection 42.

Circuits 21, 30, 40, 60, 70 of the master 2 are preferably implemented on a semiconductor chip 75. The semiconductor chip can be configured as an ASIC or FPGA, for example. Preferably the circuits 21, 30, 40, 60, 70 are separated from the processor 50, thus ensuring that at least the transceiver circuit 30 and the channel 21 can be operated independent of a program sequence on the processor 50.

Figure 2:
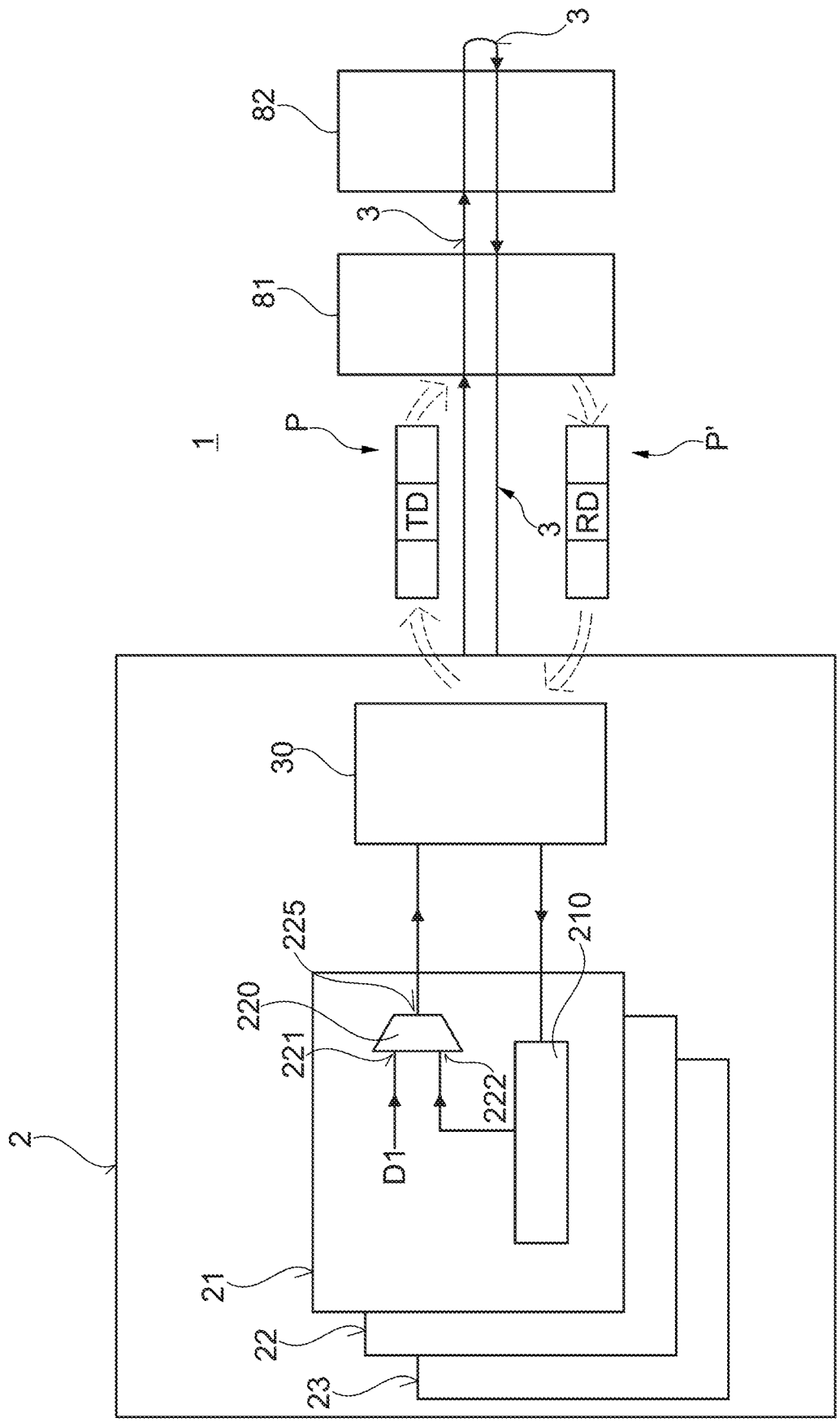
FIG. 2 is a schematic block diagram of a bus system master

FIG. 2 schematically shows an exemplary embodiment of a master 2 as a block diagram. It shows a master 2 of a bus system 1 for process control. The bus system 1 also has a bus 3 and a first slave 81 and a second slave 82. The skilled person is well aware that a different number of slaves may be required depending on the scope of the process control. Also shown schematically is a data packet P, which is generated and transmitted by a transceiver circuit 30 of the master 2. The transceiver circuit is set up to send transmit data TD and for the reception of receive data RD for the process control by means of data packets P, P'. The transceiver circuit 30 is set up to generate the data packet P to be transmitted with a head and a data section. The transmitted data packet P is transmitted via the bus 3 to the slaves 81, 82 and sent back to the transceiver circuit 30 of the master 2. The data packet P' received by the transceiver circuit 30 was also originally generated by the transceiver circuit 30. In contrast, the slaves 81, 82 do not generate data packets.

The data packet P transmitted by the transceiver circuit 30 contains transmit data TD. The data packet P' received by the transceiver circuit 30 contains receive data RD. Data in the data packet P can be modified by the slaves 81, 82. Accordingly, the transmit data TD and the receive data RD are identical or different. Both transmit data TD and receive data RD may be required for process control. The transceiver circuit 30 is set up to receive the data packet P' with a head and a data section via the bus 3 and to read the receive data RD from the data section PL of the received data packet P'.

The master 2 has a channel 21 which is linked to the transceiver circuit 30. The embodiment in FIG. 2 shows that the master 2 can have additional channels 22, 23. The master 2 is configured to select the transmit data TD from one of the channels 21, 22, 23 and to write the transmit data TD from the selected channel 21, 22, 23 to a payload data section of the data packet P. Each channel 21, 22, 23 has an associated memory area 210, 230 for its transmit data TD. The master 2 can therefore store transmit data TD of different channels concurrently. This allows for the bus system 1 to be used particularly flexibly. For example, reconfiguration is possible during operation.

In the embodiment shown in FIG. 2, each channel 21, 22, 23 has a receive data memory area 210, whereas in FIG. 2 only the receive data memory area 210 of channel 21 is shown schematically. The receive data memory area 210 has at least one corresponding capacity to store all receive data RD of the received data packet P' at the same time. This offers the advantage of making the receive data RD available for one or more data packets to be sent later. The receive data RD of a data packet is completely preserved at least until the reception of a subsequent data packet.

The transceiver circuit 30 is configured in such a way that the receive data RD of the data packet P' received via the bus 3 is written to the receive memory area 210 of the corresponding channel 21, 22, 23. A different data packet P can be sent with each channel 21, 22, 23. As shown in the embodiment in FIG. 2, the transceiver circuitry 30 is set up to generate different data packets P to be sent, each with a head and a data section.

The slaves 81, 82 are configured to distinguish the different data packets. The embodiment in FIG. 2 shows the master 2 configured to write an identifier corresponding to the selected channel 21, 22, 23 to the data packet P and to send the data packet P containing the identifier and the transmit data TD to the slaves 81, 82. The slaves 81, 82 are configured to receive the data package P. Each slave 81, 82 reads a part of the transmit data TD of the master 2 or does not read any transmit data TD, if for example the transmit data TD are not intended for the slave 81. Each slave 81, 82 writes a part of the receive data RD to the master 2 or does not write any receive data RD if, for example, no data is to be addressed to the master 2. The data packet P' is sent back to the master 2 by the last slave 82 in the sequence and is received by the master 2.

The master 2 is configured to re-assign the received data packet P' to the selected channel 21, 22, 23 based on the identifier and to store receive data RD of the received data packet P' in the selected channel 21, 22, 23. A channel 21,22,23 according to the embodiment shown in FIG. 2 is a hardware circuit that is associated with a specific logical channel of the transmission via the bus 3. Accordingly, channels 21, 22, 23 do not refer to the physical transmission channel.

The channel 21 of the master 2 according to the embodiment shown in FIG. 2 comprises at least one memory area 210 for receive data. The transceiver circuit 30 is configured in such a way that the receive data RD of the data packet P' received via the bus 3 is written to the memory area for receive data 210. To receive the data packet P', the transceiver circuit 30 continuously checks the signal stream sent by the first slave 81. The content of the data section with the receive data RD is written from the data packet P' to the first channel 21 if the data packet P' is logically assigned to the first channel 21.

The channel 21 of the master 2 according to the embodiment shown in FIG. 2 comprises at least one selection circuit 220. The selection circuit 220 has the function of selecting between data applied to different inputs 221, 222 and outputting the selected data at the output 225. An output 225 of the selection circuit 220 is linked to the transceiver circuit 30 according to the embodiment shown in FIG. 2. The inputs 221, 222 and the output 225 may, for example, be formed by hardware, such as the inputs 221, 222 forming the output 225 of a multiplexer. Alternatively, the inputs 221, 222 and the output 225 may be formed using addressing. Accordingly, selected data can be output to the transceiver circuit 30 from the selection circuit 220.

According to the embodiment shown in FIG. 2, the selection circuit 220 has a first input 221 for selecting initial data D1. The initial data D1 can have different origins depending on the embodiment. Nevertheless, the initial data D1 is not obtained from the receive data RD. For example, the initial data D1 is generated by the processor 50, a microcontroller of the master 2. Other origins of the initial data D1 are shown in the other embodiments in FIGS. 3 and 4.

According to the embodiment shown in FIG. 2, the selection circuit 220 has a second input 222. The second input 222 of the selection circuit 220 is linked to the receive memory area 210. Advantageously, the connection between the receive memory area 210 and the second input 222 is configured for direct transmission of the receive data RD. The direct connection is realized for example by means of direct connection lines in an FPGA. Alternatively, the direct connection enabling direct transmission can be realized by a copy machine, e.g., a DMA controller, controlled by a finite automaton. In all cases a processor, such as a CPU, is not required for the transmission, so a running program in a processor is not interrupted by the transfer and does not require processor resources.

The receive data RD can be selected in the receive memory area 210 by the selection circuit 220. According to the embodiment shown in FIG. 2, the selection circuit 220 is configured to select the transmit data TD from the initial data D1 and/or the receive data RD written to the memory area for the receive data 210. The selection circuit 220 is configured to output the transmit data TD to the transceiver circuit 30 for a data packet P to be transmitted. The transceiver circuit 30 generates the data packet P and is configured to write the transmit data TD to the data section of the data packet P when the data packet P to be transmitted is generated. According to the embodiment shown in FIG. 2, each transmitted data packet P is transmitted via bus 3 to the slaves 81, 82 and back to the master 2 and is received there as data packet P', now however with the receive data RD.

The embodiment in FIG. 2 shows the selection circuit 220 schematically using the symbol of a multiplexer. It is clear to the skilled person that the purpose of the selection circuit 220 can be achieved not only by a multiplexer, but also by an equally effective gate logic or by an equally effective memory addressing.

Figure 3:
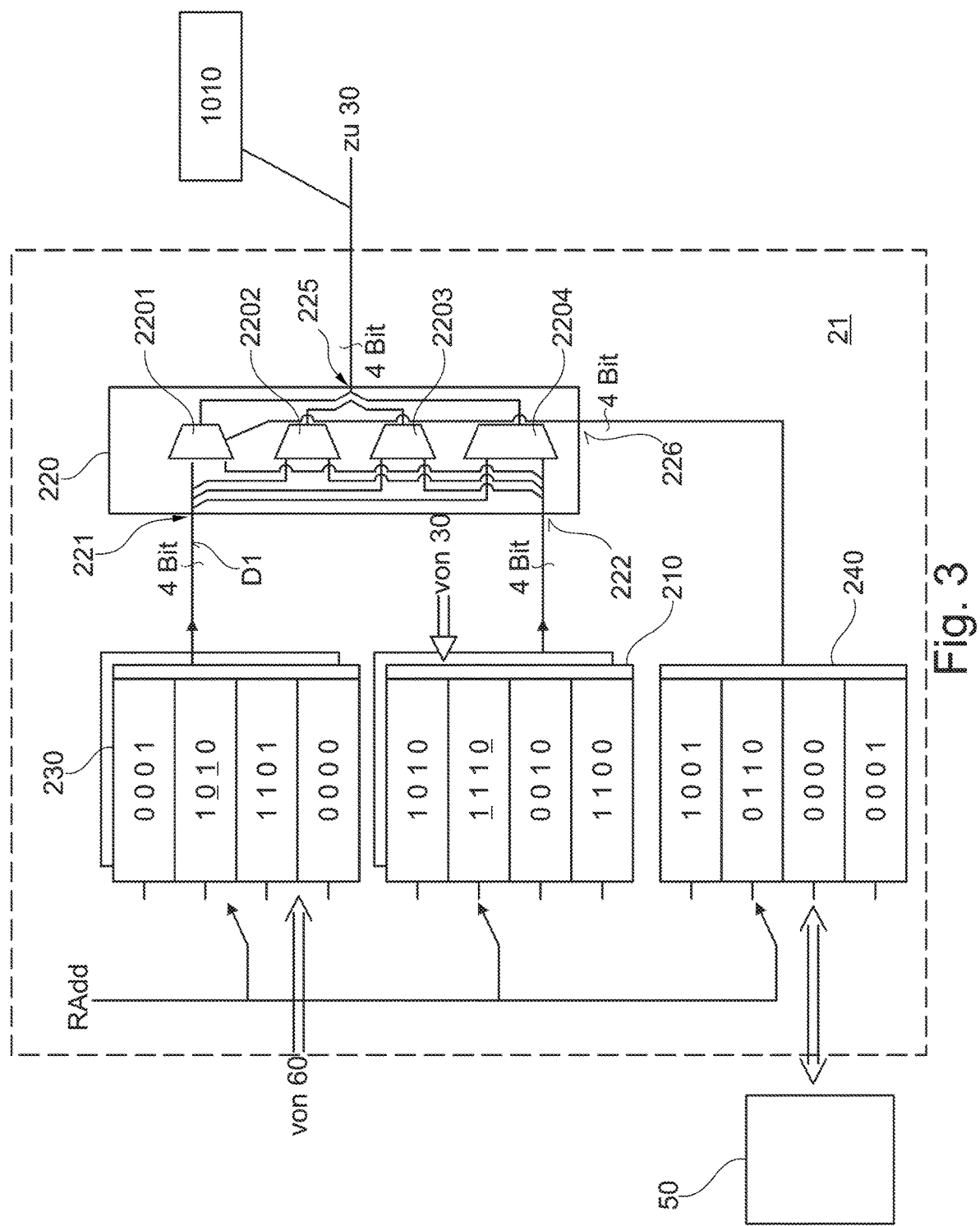
FIG. 3 is a schematic block diagram of a master channel

The slaves 81, 82 in the embodiment shown in FIG. 2 are configured for replacement, i.e., removal or addition, during operation of the bus system 1. If a slave 81 participates in the communication on the bus 3, it will modify the data assigned to it in the transmit data TD of the data packet P, so that the data packet P' received by the master 2 contains the data modified by the slave 81 in the receive data RD. If, on the other hand, the slave 81 does not participate in the communication on the bus 3, for example because the slave fails or is disconnected from the bus 3, it can no longer effect modification of the data in the data package P. Accordingly, the slave 81 would not process the data packet P, i.e., would not overwrite the data assigned to it. FIG. 3 shows an embodiment of this problem.

A channel 21 of a master 2 is shown schematically in FIG. 3. The channel 21 in FIG. 3 comprises a receive memory area 210 and a selection circuit 220. The receive memory area 210 and the selection circuit 220 are connected to a transceiver 30 (not shown). The channel 21 has a transmission memory area 230 for storing the initial data D1. In addition, the channel 21 comprises a memory area for control information 240. The receive memory area 210 and/or the transmission memory area 230 are, for example, configured as part of a main memory of a semiconductor chip. Advantageously, the receive memory area 210 and/or the memory area of the transmit data 230 provide a FIFO functionality. The receive memory area 210 and/or the transmission memory area 230 are, for example, configured as a buffer.

The initial data D1 in the transmission memory area 230 are, for example, process data originating from a fieldbus. Accordingly, in the embodiment shown in FIG. 3, the transmission memory area 230 is linked to a fieldbus interface circuit 60 as needed via further circuits and connections of the master 2. The fieldbus interface circuit 60 is schematically shown in FIG. 1, for example. The fieldbus interface circuit 60 is linked to the transmission memory area 230 of the channel 21 in the embodiment shown in FIG. 3 for inputting process data received via the fieldbus 9 as the initial data D1 to the transmission memory area 230. In a different embodiment—as an alternative to the representation in FIG. 3—the initial data D1 can also originate from the processor 50 of the master 2.

According to the embodiment shown in FIG. 3, the selection circuit 220 is configured for bit-granular selection. To enable a bit-granular selection, the selection circuit 220 is used to combine transmit bits of the transmit data TD from bits of the first data D1 and bits of the receive data RD bit by bit. The embodiment in FIG. 3 shows a bit width of 4 bit. However, the skilled person is aware that bit widths of 8, 16 or 32 bits, for example, can be provided in order to create a corresponding number of bits to be selected. Accordingly, the first input 221 of the selection circuit 220 for the initial data D1 has a bit width of several bits—here of 4 bits. The second input 222 of the selection circuit 220 also has an identical bit width.

According to the embodiment shown in FIG. 3, the selection circuit 220 comprises a switching element 2201, 2202, 2203, 2204 for each of the multiple bits. The switching element 2201, 2202, 2203, 2204 for each bit is a changeover switch, in the simplest case. The selection circuit 220 is set up so that the switching elements 2201, 2202, 2203, 2204 can be controlled independently of each other. According to the embodiment shown in FIG. 3, the selection circuit 220 has a 4-bit wide control input 226. The channel 21 advantageously has a memory area for control information 240 comprising control values for control of the selection circuit 220. The control values are present at the control input 226 of the selection circuit 220. To synchronize the output of the initial data D1 from the transmission memory area 230 and the receive data RD and the control values from the memory area for control information 240, addressing is provided in the embodiment shown in FIG. 3. The corresponding memory cells are read out simultaneously using the address RAdd. In the embodiment shown in FIG. 3, the data and control values in all the second rows correspond to each other. This is shown schematically by the pointers of address RAdd. According to the currently addressed control values, the middle bits 0 and 1 of the initial data D1 and the outer two bits 1 and 0 of the receive data RD are selected by the two ones 1 1 of the control values. The selection result is correspondingly 1 0 1 0 and schematically shown at the output 225 of the selection circuit 220. Advantageously, the processor 50 of the master 2 is linked to the control memory area 240, wherein the processor 50 is configured to program the control values in the control memory area 240.

According to the embodiment shown in FIG. 3, a procedure is advantageously provided for operating the bus system 1 shown in FIG. 1. An initial step is to generate a data packet P with transmission data TD for process control from the transceiver circuit 30 of the master 2. In a subsequent step, the master 2 writes the transmit data TD from a selected channel 21 to a payload data section of the data package P. For this purpose, for example, in contrast to the representation in FIG. 3, only the initial data D1 from the transmission memory area 230 is selected by the selection circuit. Since further channels 22, 23 may be provided, in a following step the master 2 writes an identifier ILI (see FIG. 5) corresponding to the selected channel 21 into the data packet P. The identifier ILI may also be referred to as an index. The identifier allows for easy assignment to both the master 2 and the slaves 81, 82.

In a subsequent step, the data packet P containing the identifier ILI and the transmit data TD is transmitted to the slave 81, 82 by the transceiver circuit 30 of the master 2. When the data packet P has passed all the slaves 81, 82, the data packet P sent to the slave 81, 82 is transmitted back to the master 2 and the data packet P' is received by the transceiver circuit 30. In a next step, the receiving data packet P' is assigned to the selected channel 21 by the transceiver circuit 30 of the master 2 based on the identifier ILI. During this process, the transceiver circuit 30 stores the receive data RD of the receiving data packet P' in the selected channel 21.

It is advantageous if the master 2 is configured to detect failure of a slave, e.g., 81, to participate in the bus communication on the bus 3. For example, the number of slaves counted does not match an expected number of slaves. This makes it particularly easy for the master 2 to determine the failure of a slave 81 to participate in the bus communication on the bus 3. This assessment can be performed by the processor 50, for example. By querying via the bus 3 it can be determined that exactly slave 81 is no longer participating in the bus communication. In a subsequent step, the master 2 writes a part of the receive data RD corresponding to the determined slave 81 into the transmit data TD of the channel 21. For this purpose, the processor 50 writes the corresponding control values into the control memory area 240. In this regard, the last valid data received by the slave 81, which is no longer participating in the communication, is transferred from the receive data RD to the transmit data TD. This has the effect that the data values received by the slave 81 as the last valid are frozen. This is also known as the Hold Last Value function. This has the advantage that only valid values are used, which are obsolete but cannot cause instability in the process. Standard default values, on the other hand, can deviate significantly from the last valid value, which can cause significant discontinuities in the system. In addition, the solution according to the embodiment shown in FIG. 3 has the advantage that when communication is resumed by e.g., the slave 81 that was previously removed and now re-plugged, current values are seamlessly transmitted again, so that the process can continue uninterrupted.

Figure 4:
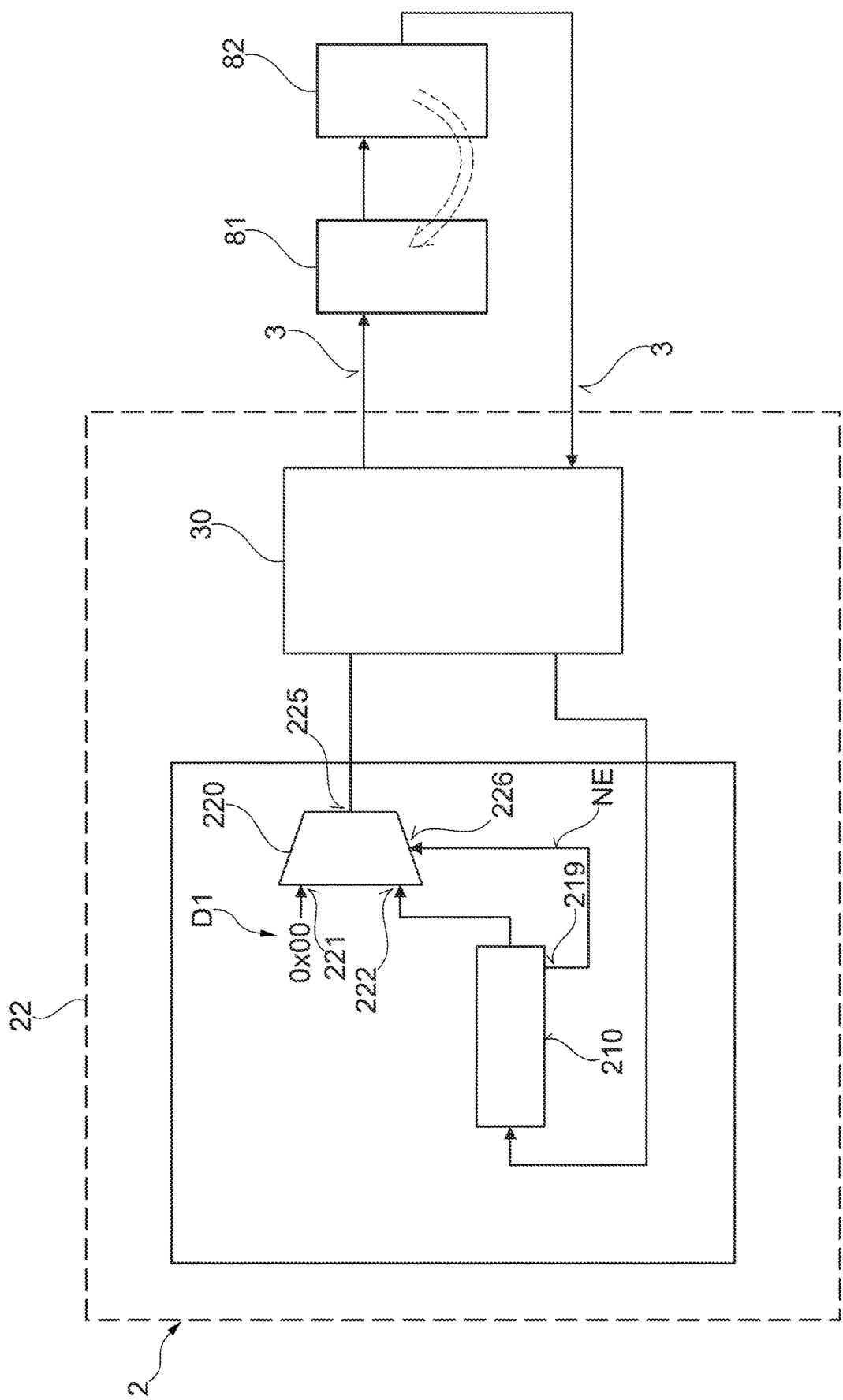
FIG. 4 is a schematic block diagram of a further master channel.

FIG. 4 shows a schematic example of a master 2 as a block diagram. Also shown are a bus 3 and a first slave 81 and a second slave 82. The master 2 has a transceiver circuit 30 and a channel 22. The channel 22 has a selection circuit 220 and a receive memory area 210. The initial data D1 of the channel 22 is available as fixed data at the first input 221 of the selection circuit 220. The initial data D1 is generated by means of connections to high potential and/or low potential, according to the embodiment shown in FIG. 4. FIG. 4 shows an exemplary embodiment of the initial data D1 being zero values. An alternative embodiment to that shown in FIG. 4 shows that the initial data D1 are defined by programming, in particular of a non-volatile memory area.

The receive memory area 210 has a control output 219 for issuing a control signal NE to control the selection circuit 220. Here, the control output 219 of the receive memory area 210 is connected to a control input 226 of the selection circuit 220. The receive memory area 210 is set up to apply a value of the control signal NE based on the reception of the receive data RD to control input 226 of selection circuit 220. If, for example, the receive memory area 210 is empty because no valid data packet P' has been received, then the value of the control signal NE corresponds to a selection exclusively of the fixed initial data D1 by the selection circuit 220. If, however, a valid data packet P' has already been received, then the value of the control signal NE corresponds to a selection of only the receive data RD by the selection circuit 220. A defined initial state can be achieved by the fixed initial data D1; undefined communication is avoided.

The embodiment as shown in FIG. 4 can be used to achieve advantageous slave-to-slave communication. According to the embodiment shown in FIG. 4, the channel 22 is configured for slave-to-slave communication. In a slave-to-slave communication procedure, it is advantageous to use the method steps explained below.

In a first step, the transceiver circuit 30 is controlled by the control circuit 40 to generate a data packet P corresponding to the channel 22. Since the receive memory area 210 is still empty, the selection circuit 220 writes the fixed initial data D1—e.g., excluding zeros—into the payload data section of the data packet P. This initial data packet P is sent via the bus 3 to the slaves 81, 82.

If, for example, data is to be transmitted from the second slave 82 to the first slave 81, the second slave 82 will write this data to be transmitted into the data package P.

Then, the data packet P' is received by the transceiver circuit and the receive data RD is written into the receive memory area 210 by the transceiver circuit 30. For a subsequent data packet P to be transmitted, the receive data RD stored in the receive memory area 210 of the selected channel 22 is completely written into the transmit data TD. Here, the control signal NE has a value which is associated with a non-empty receive memory area 210.

In this way, the data written by the second slave 82 into the first data packet P reaches the first slave 81 unchanged by means of the subsequent second data packet P. It is clear to the skilled person that communication can also take place in the opposite direction from the first slave 81 to the second slave 82.

Although the embodiment in FIG. 4 shows that a new data packet P with a payload data section is generated in each cycle by the transceiver circuit 30, the receive data RD is transferred unchanged to the transmit data so that the payload data section practically circulates in the bus system via the bus 3. The transmission is preferably cyclical.

Figure 5:
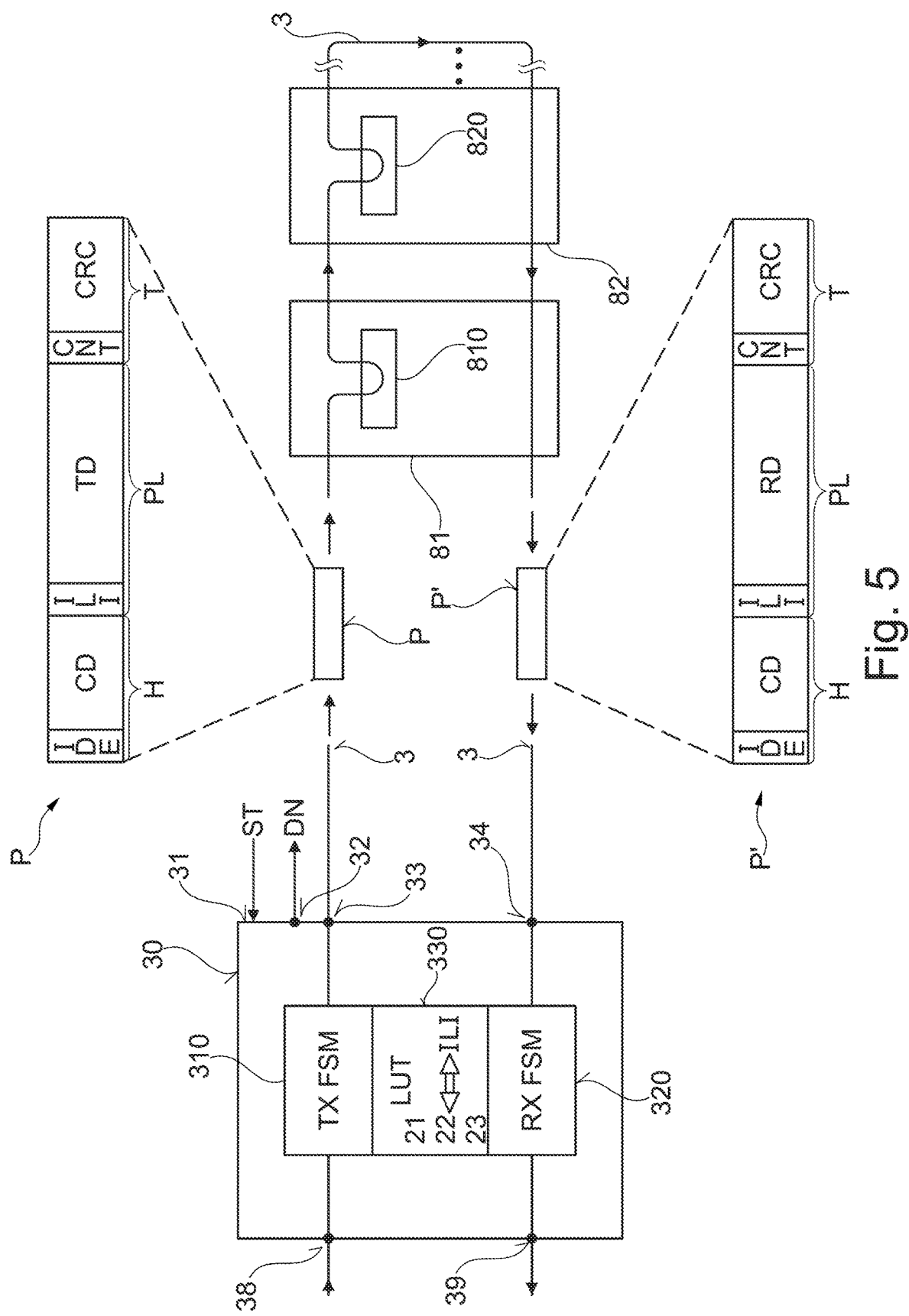
FIG. 5 is a schematic representation of data packets in a bus system.

According to the embodiment shown in FIG. 5, the transmission of data packets P, P' between the transceiver circuit 30 and the slaves 81, 82 is shown schematically. In the embodiment as shown in FIG. 5, the transceiver circuit 30 is configured so as to generate the data packet P for the transmit data TD and accordingly also the original data packet of the receive data RD. The transmit data TD and the receive data RD are used for process control. According to the embodiment shown in FIG. 5, the transceiver circuit 30 has a first finite state machine 310, which is configured to generate the data packet P. In this context, the first finite state machine 310 is set up to generate the data packet P' with a head H and a data section PL for the transmit data TD. Furthermore, the data package may have a trailer T. Pursuant to the embodiment as shown in FIG. 5, the trailer contains a count value CNT and a check value CRC (Cyclic Redundancy Check). The data section PL (payload) contains the data TD, RD and an identifier ILI. The data section PL may also be called payload data section. The head H has a packet identifier defining the type of the transmitted data packet P and the control data CD. Each data packet P generated and sent by the transceiver circuit 30 is transmitted via the output 33 and the bus 3 by the slaves 81, 82 back to the input 34 of the transceiver circuit 30. The received data packet is designated as P' in FIG. 5 since the sent transmit data TD in the data section PL can be modified by the slaves 81, 82, which enables reception of the receive data RD by the transceiver circuit 30. The structure of the transmitted data packet P and the received data packet P' is however unchanged. Advantageously, the length of the transmitted data packet P and the received data packet P' is also the same.

Pursuant to the embodiment as shown in FIG. 5, the transceiver circuit 30 has a control input 31. A control circuit 40, as in FIG. 1, or a processor may for instance be connected to the control input 31. The transceiver circuit 30 is configured to generate the data packet P based on a control signal ST at control input 31. To confirm the transmitted data packet P, a confirmation signal DN can be issued at the signal output 32.

As explained in the previous figures, the transceiver circuit 30 is connected to one or more channels 21, 22, 23 via the inputs/outputs 38, 39.

Via the input 31, the transceiver circuit 30 receives a start pulse, an identifier ILI and the length of the data packet to be transmitted P. The transceiver circuit is set up to select the channel 21, 22, 23 based on the identifier ILI. This allows for the transceiver circuit 30 to assign the identifier ILI and the channel 21, 22, 23 with transmit data TD to each other. According to the embodiment as show in FIG. 5, a table LUT (Look Up Table) is provided as an assignment unit 330, wherein the identification ILI is entered on the input side and which addresses the corresponding channel 21, 22, 23 on the output side. The table LUT can be formed in the transceiver circuit 30, as shown in FIG. 5, or the table LUT is formed outside the transceiver circuit 30 and can be accessed by the transceiver circuit 30. As an alternative to table LUT, another assignment unit 330 can be provided, for example by means of addressing or the like.

The first finite state machine 310 of the transceiver circuit 30 is configured to generate the data package P for process control with the transmit data TD and the identifier ILI. The transceiver circuit 30 comprises a second finite state machine 320 and is configured to write the receive data RD of the received data packet P' to the receive memory area 210 of the channel 21, 22, 23 corresponding to the identifier ILI based on the identifier ILI contained in the received data packet P' and the assignment to the channel 21, 22, 23. According to the embodiment shown in FIG. 5, an LUT table (Look Up Table), is provided for the assignment by means of the ILI identifier, wherein the ILI identifier of the second finite state machine 320 is entered on the input side and which addresses the corresponding channel 21, 22, 23 at the output.

The data bus participants 81, 82 are configured by means of instruction lists and the identifier ILI to evaluate the data TD, RD in the data packet P. The ILI identifier may also be referred to as an index or instruction list index. For this purpose, for example, the identifier ILI precedes the process data TD, RD in the data packet P. If the first slave 81 recognizes the identifier ILI, for example due to the position of the ILI within the data packet P, the first slave stores the data TD in a receive register 810. If the second slave 82 recognizes the identifier ILI, for example due to the position of the ILI within the data packet P, the second slave stores the data TD in its receive register 820. The data TD is copied during storage, for example, and is then still contained in the payload data section PL of the data packet P. Accordingly, the slaves 81, 82 can also write data into the data packet P by modifying the data TD already existing in the data packet P to subsequent receive data RD. For example, the slave 81 has an analog input (not shown), wherein digital input data of a digitized analog signal is written into the payload data section PL of the data packet P. This modifies the data packet P and now contains the data of the digitized analog signal as receive data RD for the master 2.

If the local bus 3 is a ring bus, the local bus interface of the master is divided into two parts 33, 34. Here, data TD is sent via the connection 33 in the downlink direction to the local bus 3. For this purpose, the master 2 writes the transmit data TD from a selected channel 21, 22, 23 to a payload data section PL of the data packet P. In addition, the master 2 writes an identifier ILI belonging to the selected channel 21, 22, 23 to the data packet P. The master 2 sends the data packet P containing the identifier ILI and the transmit data TD to the slave 81, 82. Subsequently, the master 2 receives data RD of the data packet P' from the local bus 3 via the connection 34 in the uplink direction. The data packet P sent to the slave 81, 82 is transmitted back to the master 2. The master 2 assigns the receiving data packet P' to the selected channel 21, 22, 23 based on the identifier ILI and the receive data RD of the receiving data packet P' is stored in the selected channel 21, 22, 23. The validity of the receive data RD is determined by means of the CRC or a valid bit, for example.

It is clear that parts of the data packet P generated by the transceiver circuit 30 can be sent to the local bus 3 prior to validation. Especially if the parts of the data packet P pass successively through the slaves 81, 82—as shown in FIG. 5—i.e., only a part of the data packet P is sent by the master 2 at any given time, which is then forwarded by the individual salves 81, 82. With regard to the communication, the ring bus 3 shown in the embodiment in FIG. 5 is based on cyclic communication in frame format.

A cyclic frame can be defined, for example, as a recurring (cyclic), preferably equidistant time frame in which data can be transmitted on the ring bus 3. For example, the cyclic frame has at least one start identifier and a time frame for the transmission of data. Several start identifiers of consecutive cyclic frames are advantageously equidistant in time. The indicated time frame is intended for the transmission of the data TD, RD, which can be transmitted within the cyclic frame in the form of data packets P, P'. The start identifier and the data packets P, P' are transmitted via the ring bus 3 and pass through all data bus participants, the master 2 and the slaves 81, 82. Advantageously, the cyclic frame is initiated by the master 2 in the ring bus 3. The start identifier can be transferred separately, i.e. as a separate symbol, or is advantageously included in a start data packet.

Within the time frame of the cyclic frame, no, one or several data packets P, P' are transmitted. Advantageously, idle data are inserted in a cyclic frame, especially adjacent to at least one data packet P, P'. Advantageously, the transmission of the data packets P, P' and/or the idle data effects an uninterrupted signal on the ring bus 3. The signal enables the slaves 81, 82 to time-synchronize. Each data packet P, P' is transmitted by the master 2 in the downlink direction to the first slave 81 of the ring bus 3. This receives a first part of the data packet P via its interface. The slave 81 then processes the part and then forwards it to the next slave 82 via its interface; preferably at the same time, the first slave 81 receives a second part of the data packet P and so on.

Figure 6:
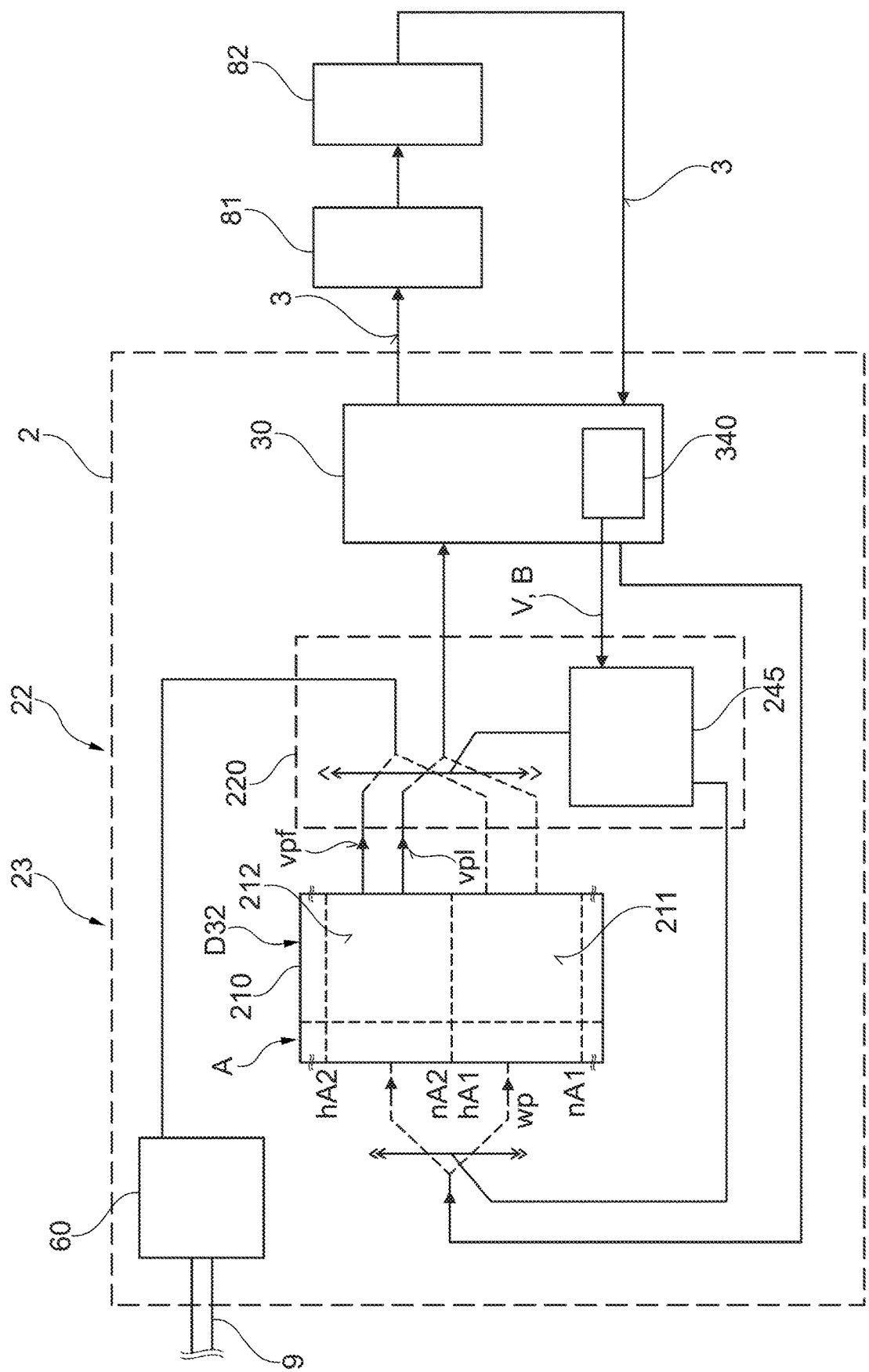
FIG. 6 is a schematic block diagram of a master.

FIG. 6 schematically shows a block diagram of a master 2 of a further embodiment of the invention. Only some of the function blocks of the master 2 are shown schematically in FIG. 2. The bus system in FIG. 6 also shows two slaves 81, 82 and a local bus 3. According to the embodiment shown in FIG. 6, the master 2 comprises a transceiver circuit 30 for transmitting transmit data and receiving receive data via the local bus 3, for example by means of data packets.

Pursuant to the embodiment shown in FIG. 6, some of the functions of two channels 22 and 23 are shown schematically, wherein the two channels 22 and 23 can be implemented in a master 2, alternatively or in combination. According to the embodiment shown in FIG. 6, a receive memory area 210 is provided, which can be shared by both channels 22, 23. Accordingly, both channels 22 and 23 comprise the receive memory area 210.

According to the embodiment shown in FIG. 6, the receive memory area 210 comprises a first buffer 211 and a second buffer 212. The buffers 211, 212 are created by different address spaces in the receive memory area 210. According to an embodiment shown in FIG. 6, for example, 32 bit-wide memory cells can be written by data blocks D32 by means of a write pointer or read out by means of a read pointer rpf, rpl by address A.

The transceiver circuit 30 is configured to write the receive data of a data packet received via the local bus 3 to the second buffer 212 by means of the write pointer wp. The write pointer wp is controlled by a control circuit 245. The write pointer wp controlled by the control circuit 245 points to an address A of the second buffer 212 if previous receive data of a previously received data packet is stored as valid receive data in the first buffer 211. A detection circuit 340 of the transceiver 30 determines whether the receive data or the received data packet is valid.

Pursuant to the embodiment shown in FIG. 6, the transceiver circuit 30 is configured to check the receive data of the received data packet and write the receive data to the receive memory area 210. The writing of the receive data can be executed independently of the validity of the receive data, wherein the validity of the receive data is stored in the respective buffer 211, 212, for example by means of a flag. If the data stored in the buffer 211, 212 are invalid, they can be overwritten with subsequent data. Alternatively, it is possible to write the receive data to a buffer 211, 212 of the receive memory area 210 only if the check result is positive and to discard it if it is invalid. The validity can be transmitted as a validity value V from the detection circuit 310 of the transceiver circuit 30 to the control circuit 245 of the selection circuit 220. The validity value V can be determined, for example, using a check value CRC32 (Cyclic Redundancy Check) or a transmitted validity bit B. The embodiment described in FIG. 6 shows the validity bit B, which can be transmitted in higher protocol layers and is designed to enable, for example, one of the slaves 81, 82 to indicate to the master 2 via the transmitted validity bit B that the receive data sent by the slave 81, 82 is invalid, for example based on a slave's own error diagnosis. The embodiment described in FIG. 6 schematically shows the two previously described possibilities with both values V, B. The detection of the validity is not limited to these two examples; thus, other validity types can be used as well.

The transceiver circuit 30 is configured to write the receive data of a data packet received via the local bus 3 to the first buffer 211 by means of the write pointer wp, if previous receive data of a previously received data packet is stored as valid receive data in the second buffer 212. This ensures that at a minimum the last valid receive data is always stored in one of the two buffers 211, 212 of the receive memory area 210 and can be used.

The control circuit 245 is also part of a selection circuit 220, which enables a selection of the data D32 stored in the memory area 210 via at least one read pointer rpl. The selection circuit 220 is a component of at least one channel 22. According to an embodiment shown in FIG. 6, an output of the selection circuit 220 is connected to the transceiver circuit 30. Due to the read pointer, the selection circuit 220 has a first input 221 for selecting the initial data. In order to initialize the circulation of process data on the local bus 3, default values are written as initial values to the first buffer 211, for example by a processor (not shown). Such default values are, for example, all zeros that are written into the memory area 210 from the lowest address nA1 of the first buffer 211 to the highest address hA1 of the first buffer 211.

If a data packet is now initially generated for circulation by the master 2, the initial data, i.e. the default values, are written as data to be sent to the data packet by means of the read pointer rpl and sent by the transceiver circuit 30. The data packet is returned to the transceiver circuit 30 of the master 2 via the slaves 81, 82, which can modify the data in the data packet. If the master 2 receives data in the data packet, these are defined as receive data. The transceiver circuit 30 is set up to receive the data packet with a head and a data section via the bus 3 and to read the receive data from the data section of the received data packet. The transceiver circuit 30 writes the receive data to the second buffer 212, as the first buffer 211 contains valid data and the default values after initialization.

According to an embodiment shown in FIG. 6, the selection circuit 220 has a second input in the form of the read pointer rpl, which enables a connection between the receive memory area 210 and transceiver circuit 30. In FIG. 6 this is shown schematically by displaying the read pointer rpl as a dashed line for another address A.

The selection circuit 220 is set up to select the transmit data from the initial data and/or the receive data written in the second buffer 212 of the receive memory area 210 and to output the transmit data to the transceiver circuit 30 for a new data packet to be transmitted.

According to the embodiment shown in FIG. 6, the transceiver circuit 30 is configured to generate the new data packet to be transmitted with a head and a data section. If—as previously explained—there are valid data in the second buffer 212 of the receive memory area 210, the control circuit 245 controls the read pointer rpl accordingly and the data D32 from the lowest address nA2 to the highest address hA2 of the second buffer 212 are copied to the transceiver 30.

The connection between the receive memory area 210 and the input of the selection circuit 220 is formed for direct transmission of the receive data from the second buffer 212. The selection circuit 220 does not require an external processor for this purpose, but can autonomously control the direct transfer, for example by means of a copy process. The receive data from the second buffer 212 are sent unchanged as transmit data to the transceiver circuit 30 in the embodiment shown in FIG. 6. The transceiver circuit 30 is configured to write this transmit data to the data section of the new data packet to be sent when the new data packet to be sent is generated.

The new data packet is in turn transmitted back to the transceiver circuit 30 of the master 2 by the slaves 81, 82. The transceiver circuit 30 again checks the validity of the receive data in this new data packet. The receive data is written into the first buffer 211 of the receive memory area 210, since the valid receive data of the previous data packet was written in the second buffer 212 and is still present there. If the new receive data of the new data packet in the first buffer are also valid, the detection circuit 340 of the transceiver circuit 30 sends a validity bit B to the control circuit 245 of the selection circuit 220.

The selection circuit 220 is configured to select the receive data from the first buffer 211 or the second buffer 212, which originate from the last received data packet having valid receive data in order to select the transmission data from the receive memory area 210. In the case described above, the latest valid receive data is now in the first buffer 211. Accordingly, for a subsequent data packet to be generated, the receive data would be copied or moved from the first buffer as transmit data into the transceiver circuit. Assuming the receive data in the first buffer 211 would be newer but invalid, the valid receive data of the last data packet with valid receive data would be reselected from the second buffer 212.

According to the embodiment shown in FIG. 6, the master 2 also has an interface circuit 60 to a higher-level bus 9, which is designed as a fieldbus, for example. Furthermore, the selection circuit 220 of the master 2 has a second read pointer rpf that allows for the reading of valid receive data from the first buffer 211 or the second buffer 212. The receive data of the last data packet with valid receive data is transferred (copied, for example) to the interface circuit 60 by means of the second read pointer rpf and transmitted via the fieldbus 9. A special channel 23 is assigned to the transmission via the fieldbus 9 in the master 2. The channel 23 accordingly has the interface circuit 60 as its own hardware for the function of this channel 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A master of a bus system for process control with one slave and one bus, comprising:
   a transceiver circuit for transmitting transmit data and receiving receive data for process control via data packets; and
   a channel that has a receive memory area;
   wherein the transceiver circuit is arranged so as to write the receive data of a data packet received via the bus to the receive memory area,
   wherein the channel has at least one selection circuit, an output of the selection circuit being connected to the transceiver circuit,
   wherein the selection circuit has a first input for the selection of initial data,
   wherein the selection circuit has a second input, the second input being connected to the receive memory area, and
   wherein the selection circuit is set up to select the transmit data from the first data or the receive data written to the receive memory area and to output the transmit data to the transceiver circuit for a data packet to be transmitted.

2. The master according to claim 1, wherein the transceiver circuit is set up to generate the data packets for the transmitted data and the receive data with a header and a payload data section for the transmitted data or receive data.

3. The master according to claim 1, wherein the transceiver circuit is configured to receive a data packet with a header and a payload data section via the bus and to read the receive data from the payload data section of the received data packet.

4. The master according to claim 1, wherein the transceiver circuit is arranged to generate a data packet to be transmitted with a header and a payload data section.

5. The master according to claim 1, wherein a link between the receive memory area and the second input is designed for direct transmission of the receive data.

6. The master according to claim 1, wherein the transceiver circuit is set up to write the transmit data to a payload data section of the data packet to be transmitted when the data packet to be transmitted is generated.

7. The master according to claim 1, wherein the transceiver circuit is configured to check the receive data of the received data packet.

8. The master according to claim 1, wherein the receive memory area has enough capacity for storing all the receive data of the received data packet simultaneously.

9. The master according to claim 1, wherein the receive memory area comprises a first buffer and a second buffer, wherein the transceiver circuit is configured to write, the receive data to the second buffer when previous receive data of a previously received data packet is stored as valid receive data in the first buffer, or to write the receive data to the first buffer when previous receive data of a previously received data packet is stored as valid receive data in the second buffer.

10. The master according to claim 9, wherein the selection circuit for selecting the transmit data from the receive memory area is arranged to select the receive data from that of the first buffer or the second buffer which originate from the data packet last received and having valid receive data.

11. The master according to claim 1, wherein the transceiver circuit is set up to assign the channel to the transmit data and/or or the receive data by an identifier in the data packet.

12. The master according to claim 11, wherein the transceiver circuit is a first finite state machine and is configured to generate the data packet for process control with the identifier via the first finite state machine.

13. The master according to claim 11, wherein the transceiver circuit has a second finite state machine and is configured to write the receive data of the received data packet to the receive memory area of the channel based on the identifier contained in the received data packet and the assignment to the channel.

14. The master according to claim 1, wherein the transceiver circuit has a control input and is configured to generate the data packet based on a control signal at the control input.

15. The master according to claim 1, wherein the channel for storing the initial data has a transmission memory area.

16. The master according to claim 15, further comprising a fieldbus interface circuit, wherein the fieldbus interface circuit is connected to the transmission memory area of the channel for inputting process data received via a fieldbus as the initial data into the transmission memory area.

17. The master according to claim 1, wherein the selection circuit is configured for bit granular selection, wherein via the selection circuit, transmission bits of the transmit data is composed bit by bit of bits of the initial data and bits of the receive data.

18. The master according to claim 1, wherein the first input of the selection circuit for the initial data has a bit width of several bits, and wherein the selection circuit has a switching element for each of the plurality of bits, wherein the switching elements are independently controlled.

19. The master according to claim 1, wherein the channel has a control memory area with control values for controlling the selection circuit.

20. The master according to claim 1, wherein the initial data of the channel are fixed data which are available at the first input of the selection circuit.

21. The master according to claim 20, wherein the receive memory area has a control output for output of a control signal for controlling the selection circuit, wherein the receive memory area is configured to apply a value of the control signal based on the reception of the receive data to an input of the selection circuit.

22. A method for operating a bus system for process control with a master and a slave, the method comprising:

generating by the master a data packet with transmission data for process control;

writing by the master the transmission data from a selected channel into a payload data section of the data packet;

writing by the master an identifier associated with the selected channel into the data packet;

sending by the master the data packet containing the identifier and the transmission data to the slave;

transmitting the data packet sent to the slave, back to the master and the data packet is received by the master;

assigning by the master the receiving data packet to the selected channel based on the identifier; and storing receive data of the receiving data packet in the selected channel.

23. The method according to claim 22, wherein at least a part of the receive data stored in the selected channel for a subsequently transmitted data packet is written to the transmit data.

24. The method according to claim 23, wherein the master detects a failure of a slave to participate in bus communication on the bus, wherein the master writes a part of the receive data corresponding to the detected slave into the transmitted data of the channel.

25. The method according to claim 22, wherein the receive data stored in the selected channel is completely written into the transmitted data for a subsequent data packet to be transmitted.

26. A bus system for process control, the bus system comprising:

a master; and a slave, wherein the master is set up to generate a data packet with transmission data for process control, wherein the master is set up to write the transmission data from a selected channel to a payload data section of the data packet, wherein the selected channel has a respective associated memory area for its transmitted data, wherein the master is configured to write an identifier associated with the selected channel into the data packet, wherein the master is configured to send the data packet containing the identifier and the transmit data to the slave, wherein the slave is configured to receive the data packet, to read at least a part of the transmit data based on the identifier and/or or to write at least part of the receive data and to send the data packet back to the master, wherein the master is configured to receive the data packet, wherein the master is configured to assign the received data packet to the selected channel based on the identifier, and wherein the master is configured to save the receive data of the received data packet in the selected channel.

* * * * *